April 9, 1968 R. C. WARREN ETAL 3,377,083
CAR WEIGHTS
Filed Nov. 25, 1966

INVENTORS.
ROBERT C. WARREN
JOHN C. BAUMANN

BY *Robert G. McMorrow*
ATTORNEY

United States Patent Office 3,377,083
Patented Apr. 9, 1968

3,377,083
CAR WEIGHTS
Robert C. Warren and John C. Baumann, both of
327 Main St., Childs, Pa. 18407
Filed Nov. 25, 1966, Ser. No. 597,152
7 Claims. (Cl. 280—150)

ABSTRACT OF THE DISCLOSURE

This invention relates to a car weight and more particularly to a portable weight blanket adapted for use in the application of additional weight to a vehicle body at selected locations.

---

It has been previously known in the art to provide weight means of an auxiliary type for application to vehicle bodies to increase the traction characteristics of the vehicle under certain load conditions. Previous proposals have included solid mechanical elements attachable to vehicle bumpers, axles, and the like, and have further included basic expedients such as the employment of sandbags, cement, and the like in vehicle trunk sections. These previous proposals, while effective to some extent for the purpose indicated, have been objected to on the basis of difficulty of installation and removal, likelihood of damage to the vehicle under certain conditions, and inconvenience of handling.

It is a basic objective of the present invention to provide a weight blanket which is readily positioned at a desired location within the vehicle and which may easily and safety be moved to another location.

Further objectives of the invention include the provision of a heavy blanket effective to impart an additional weight to a vehicle body, or the like, which is easily and safetly handled and which is unlikely to cause damage if dropped or thrown against an object.

A further important advantage of the invention resides in the provision of a weight blanket of compact configuration which consumes a minimum amount of space and does not interfere with the normal use of the portion of the vehicle in which it is positioned.

Still another objective is to provide a blanket as aforesaid which is not easily displaced and therefore does not tend to bounce, shift or roll responsive to vehicle motion.

An additional advantage of the invention resides in the fact that the blankets may be used in emergencies as repair pads.

Another objective is to provide a blanket as aforesaid which maximizes the even distribution of weight throughout its full extent.

In the event of accidental impact or upset of a vehicle, the weights hereof are unlikely to injure occupants or to damage the interior of the vehicle.

The weight blankets hereof are readily folded for storage and unfolded for use.

Other and further objects and advantages will become apparent to those skilled in the art from a consideration of the following specification when read in conjunction with the annexed drawings, in which.

Figure 1:
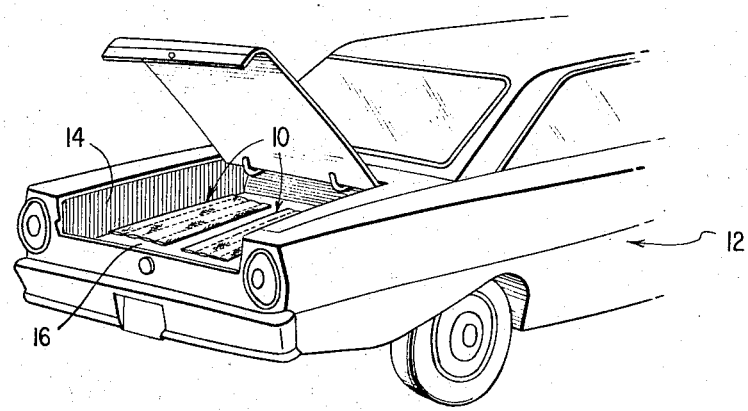
FIGURE 1 is a perspective view of the rear portion of a vehicle with its trunk lid in an open position, showing weight blankets constructed and assembled in accordance with the teachings of the present invention in place therein.
Figure 2:
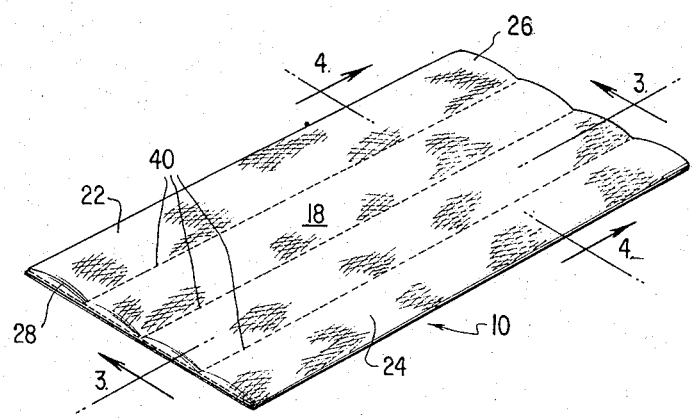
FIGURE 2 is an enlarged perspective view of a blanket per se.
Figure 3:
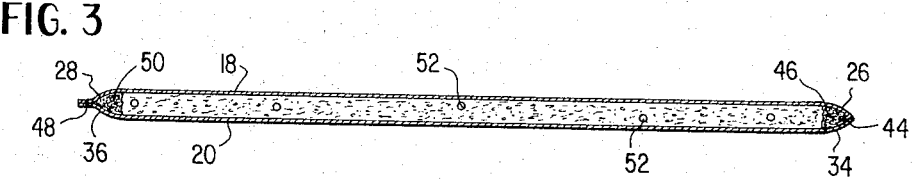
FIGURE 3 is a further enlarged, sectional view taken substantially on the section line 3—3 of FIGURE 2, looking in the direction of the arrows.

Referring to the drawings in more detail, the weight blanket of the present invention is there generally designated by reference numeral 10. The blanket 10 is usable in many different locations within a vehicle or the like, but is shown to advantage as employed in FIGURE 1 in association with a vehicle 12 having a trunk section 14 with a floor 16 therein. The weights 10 may be used in any selected arrangement and may be stacked or used singly. Ideally, the weights are supplied in standard sizes and of standard gross weights such as, by way of example only, weights of a total of thirty-seven and one half pounds, fifty pounds, and seventy-five pounds. This permits even distribution where it is desired to place an equal weight adjacent each wheel of the vehicle.

Figure 4:
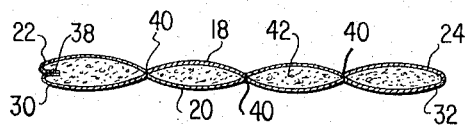
FIGURE 4 is a transverse sectional view taken on the line 4—4 of FIGURE 2, looking in the direction of the arrows.

In construction, each of the weight blankets comprises two panels 18 and 20 of a closely knit fabric material such as denim, canvas, or the like. The panels 18 and 20, comprising an overlying panel and an underlying panel, are superposed over one another. The overlying panel 18 has side portions 22 and 24 and end portions 26, 28. The underlying panel 20 similarly has side portions 30, 32, and end portions 34, 36. As best seen in FIGURE 4, the panels may be integrally or otherwise fixedly joined to one another along their respective side portions 24 and 32, and are connected by an internal seam 38 at the side portions 22 and 30. Longitudinal lines of stitching 40 divide the superposed panels into a plurality of sleeve sections 42 whereby the interior of the blanket is sectionalized or quilted.

The ends 26 and 34 are joined to one another by an internal seam 44, the stitching of which also extends through a selected quantity of hirsute material 46 such as fibrous insulation or the like. The opposite ends 28 and 36 are also closed by a line of stitching 48 which joins a further quantity 50 of the fibrous material at that end. This connection of the fibrous material at the ends of the blanket serves to prolong the life thereof by shielding the seams from direct contact with the weight imparting material.

Each of the compartments 42 is substantially filled with a mixture consisting of a weight imparting material and a bulk material for even distribution of the weight. In a preferred embodiment of the invention, the weight imparting material comprises metallic punchings of galvanized material, which punchings are readily available as scrap in many machine operations. The bulk material comprises shredded rubber which is a by-product of a tire recapping operation. These materials are mentioned by way of example only, and not by way of limitation inasmuch as it is contemplated that the weight imparting material may consist of any fine metallic particle such as a lead pellet, crushed iron ore, cast iron, steel, small waste items such as nuts and washers, or even crushed stone or gravel. It will further be apparent that material other than shredded rubber may be employed as the bulk material. The ratio of waste material to bulk material is preferably in the range of approximately three to one. This insures that the necessary weight is present to accomplish the primary purpose of the invention, and at the same time, makes handling and storage of the blanket more convenient.

Optionally, an odorizing substance in pellet form 52 may be mixed at random in the mixture of weight and bulk of materials to avoid the development of objectionable odors in the blanket.

Having described and illustrated the invention in some detail, it will be understood that this description and illustration has been offered only by way of example, and that the invention is to be limited in scope only by the appended claims.

What is claimed is:

1. A portable weight blanket for the addition of weight to vehicle bodies and the like at selected areas, the weight blanket comprising:
   an underlying panel of closely knit fabric material, having sides and ends;
   an overlying panel of said material having ends and sides and the panels being superposed on one another with the respective ends and sides in aligned pairs;
   the panels being secured to one another adjacent the respective pairs of sides thereof;
   a quantity of hirsute material positioned to extend along each pair of aligned ends of the panels;
   means extending through the ends and the hirsute material connecting the ends to one another and securing the material between the ends; and
   weight imparting means enclosed between the panels.
2. The invention of claim 1, wherein:
   the ends and sides are secured by lines of stitching.
3. The invention of claim 1, wherein:
   the panels have intermediate lines of connection therebetween dividing them into compartments.
4. The invention of claim 1, wherein:
   said weight imparting means comprises a mixture of bulk material and weight imparting material.
5. The invention of claim 4, wherein:
   the bulk material is shred rubber; and
   the heavy material is metallic chips.
6. The invention of claim 5, and:
   an odorizing substance mixed with said material.
7. The invention of claim 6, wherein:
   the blanket is mounted in the trunk portion of a motor vehicle in alignment with each wheel section thereof.

References Cited

UNITED STATES PATENTS

| | | | |
|---|---|---|---|
| D. 200,415 | 2/1965 | Tarbox | D34—5 |
| 1,577,077 | 3/1926 | Ray | 272—67 |
| 2,720,656 | 10/1955 | Allan | 272—57 |
| 3,149,839 | 9/1964 | Materia | 272—57 |

LEO FRIAGLIA, *Primary Examiner.*

J. SIEGEL, *Assistant Examiner.*